(12) United States Patent
Daoud

(10) Patent No.: US 6,457,687 B1
(45) Date of Patent: Oct. 1, 2002

(54) MECHANISM FOR MOUNTING AND VENTING AN ENCLOSURE

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/356,639

(22) Filed: Jul. 19, 1999

(51) Int. Cl.[7] ............................................. A47B 96/00
(52) U.S. Cl. ............................ 248/222.41; 248/221.11; 248/223.21; 403/32; 403/34; 403/353
(58) Field of Search ................... 248/222.11, 221.12, 248/223.21, 906, 672; 403/353, 32, 34; 174/58, 17 VA

(56) References Cited

U.S. PATENT DOCUMENTS

| | | | | |
|---|---|---|---|---|
| 1,743,831 A | * | 1/1930 | Schurr | 248/222.41 |
| 2,053,119 A | * | 9/1936 | Sturtevant | 248/223 |
| 2,839,668 A | * | 6/1958 | Mills | 248/223.21 |
| 4,460,147 A | * | 7/1984 | Macbain | 248/542 |
| 4,473,316 A | * | 9/1984 | Welch | 403/246 |
| 4,558,839 A | * | 12/1985 | Kaplan et al. | 248/542 |

* cited by examiner

Primary Examiner—Kimberly T. Wood
(74) Attorney, Agent, or Firm—Stroock & Stroock & Lavan LLP

(57) ABSTRACT

The mechanism for mounting and venting an enclosure which includes a mounting bracket which is mountable to an outdoor enclosure having an inner portion. The mounting bracket has an exterior and an interior surface. The interior surface has a mounting aperture for receiving a securement member and a venting aperture in fluid communication with said interior portion of the outdoor enclosure. Further, the mounting bracket has a bottom containing at least one vent hole in fluid communication with the venting aperture for permitting the passage of air between the interior portion of the outdoor enclosure and a space outside the enclosure.

20 Claims, 4 Drawing Sheets

MECHANISM FOR MOUNTING AND VENTING AN ENCLOSURE

FIELD OF THE INVENTION

This invention relates to a mechanism for mounting and venting an outdoor junction box or other enclosure containing electrical components or telephone lines and the like, and in particular, to provide ventilation into an outdoor enclosure while at the same time shielding the interior of the enclosure from the elements.

BACKGROUND OF INVENTION

Junction enclosures have long been used to collect and protect telephone and electrical wires for distribution, splicing, cross connection and other uses. In the telephony arts, such junction enclosures are more commonly known as junction boxes, network interface units (NIUs) and/or building entrance protectors (BEPs).

In a telephone network, a network cable from the central office is connected to a BEP located at the customer site, where the individual telephone lines are broken out line by line. The network cable, which consist of a plurality of tip-ring wire pairs that each represent a telephone line, is typically connected to a connector block that is an integral part of the BEP. Such connectors may be, for example, the ubiquitous 66-type punch down connector, or an SC 99 type connector block, such as are available from Lucent Technologies Inc. The customer telephone equipment is coupled through the connector block to a central office (CO) telephone line.

The BEP may, of necessity, be located outdoors. The BEP has a lockable outer door to protect the electrical components from the weather and for security and other reasons.

Mounting brackets are normally attached to the outer surfaces of these outdoor enclosures in order to prevent water from entering the enclosure through the mounting holes. Since the mounting holes are located on the outside, unauthorized people can remove the mounting screws. Furthermore, venting holes are normally formed in the bottom side of an outdoor enclosure. During inclement weather, water can enter the enclosure through the venting hole. Water collected inside the enclosure can eventually damage the components located within a enclosure.

SUMMARY OF THE INVENTION

The present invention provides a mechanism for mounting and venting of outdoor enclosures. The mechanism provides for convenient mounting while allowing the venting of the outdoor enclosure and also preventing water and other elements from entering the enclosure, thus avoiding the risk of damaging components mounted or stored in the interior of the enclosure.

The mounting bracket of the present invention is constructed such that the enclosure is made to mount in spaced apart relation from a mounting surface on dome shaped spacers. The internal surface of the spacer includes a keyhole shaped aperture known in the art for permitting passage of a screw or nail head or other securement member through one portion of the aperture and retention of the shank is in a second, narrower aperture portion. The bottom side of the spacer has venting holes formed therein. The mounting bracket provides ventilation to the interior of the box because air can travel from outside the enclosure through the vent holes, up through the lower portion of the keyhole shaped mounting aperture and into the interior of the box.

The spacers are located on a rear wall of the enclosure and are constructed of a rigid material and can be constructed of the same material as that of the enclosure. The external surface of the mounting bracket is preferably dome shaped, having a curved top and elongated sides which may extend to a position lower than the bottom side of the bracket. The external surface may also have a portion which forms a lip around the external surface of the mounting bracket. This lip is so configured as to help to channel water down the sides of the mounting bracket. Because the sides preferably extend beyond the bottom portion of the mounting bracket, water is prevented from entering the enclosure through the venting holes. Furthermore, having the mounting holes on the inside of the enclosure deters unauthorized users from tampering with the enclosure, since generally only authorized people can open the enclosure and reach the mounting screws. The ordinary, art recognized security mechanism that secures the enclosure would therefore also act as a security mechanism to prevent access to the mounting screws.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Reference is made to FIGS. 1–6. There is depicted a mechanism for mounting an enclosure constructed according to a preferred embodiment of the present invention. A mounting bracket 10 is preferably mounted to a rear wall 200 of an outdoor enclosure 20 of any type known in the art requiring mounting to a mounting surface and venting of an interior space. While in an exemplary embodiment an outdoor enclosure is shown and described, it will be recognized by the person of skill that the enclosure may be of any type requiring a fluid communication path between some part or all of the interior of the enclosure and an ambient environment outside of the enclosure. The outdoor enclosure has an interior portion 25, within which may be mounted any device, structure or component known in the art and generally retained in outdoor enclosures, such as, by way of non-limiting example, telephone wiring or circuitry, electrical components, cable TV equipment, signaling devices, traffic signal controllers, and the like, any or all of which require shielding from the elements.

Figure 1:
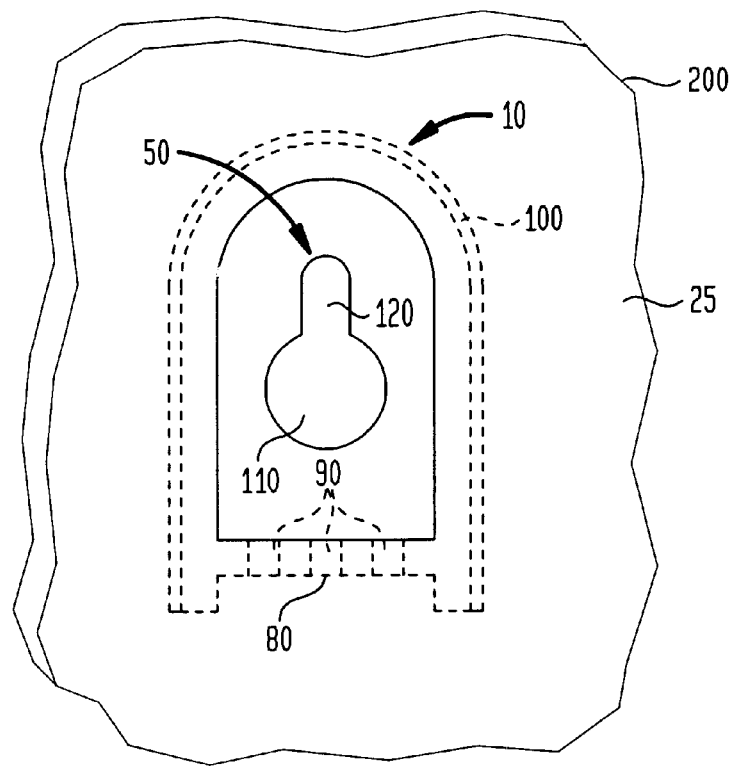
FIG. 1 is a front view of the mounting bracket as would be seen through the rear enclosure wall constructed in accordance with a preferred embodiment of the present invention.
Figure 2:
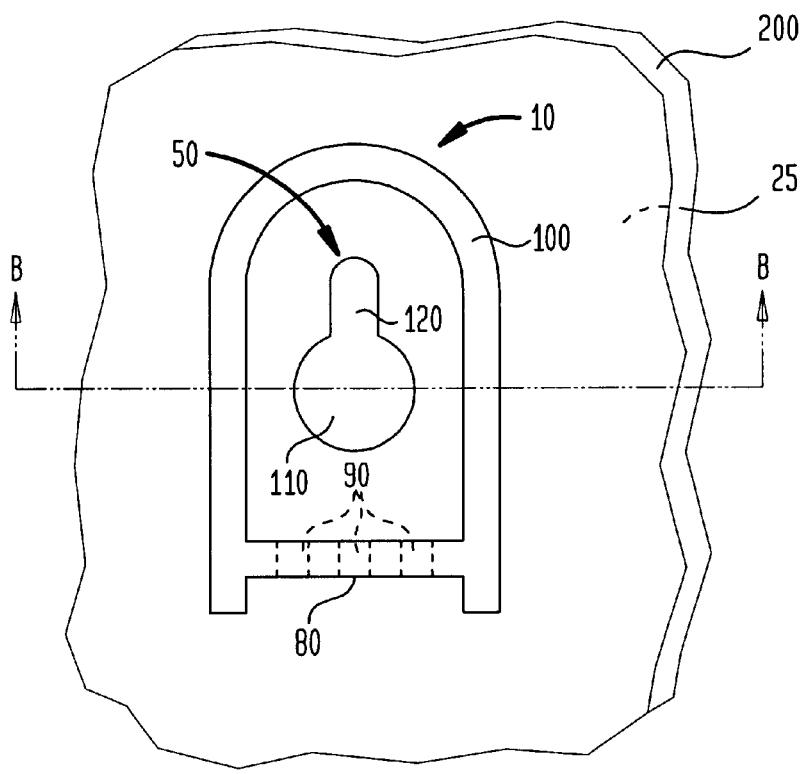
FIG. 2 is a rear view constructed in accordance with a preferred embodiment of the present invention.
Figure 3:
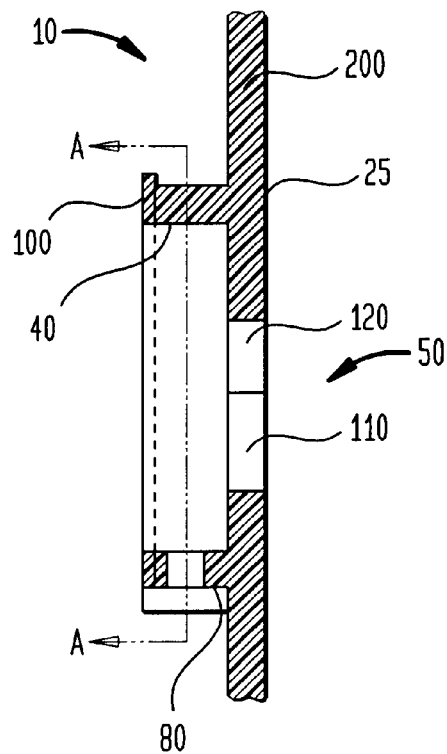
FIG. 3 is a cross sectional side view of the mounting bracket attached to a rear wall of an enclosure constructed in accordance with a preferred embodiment of the present invention.
Figure 7:
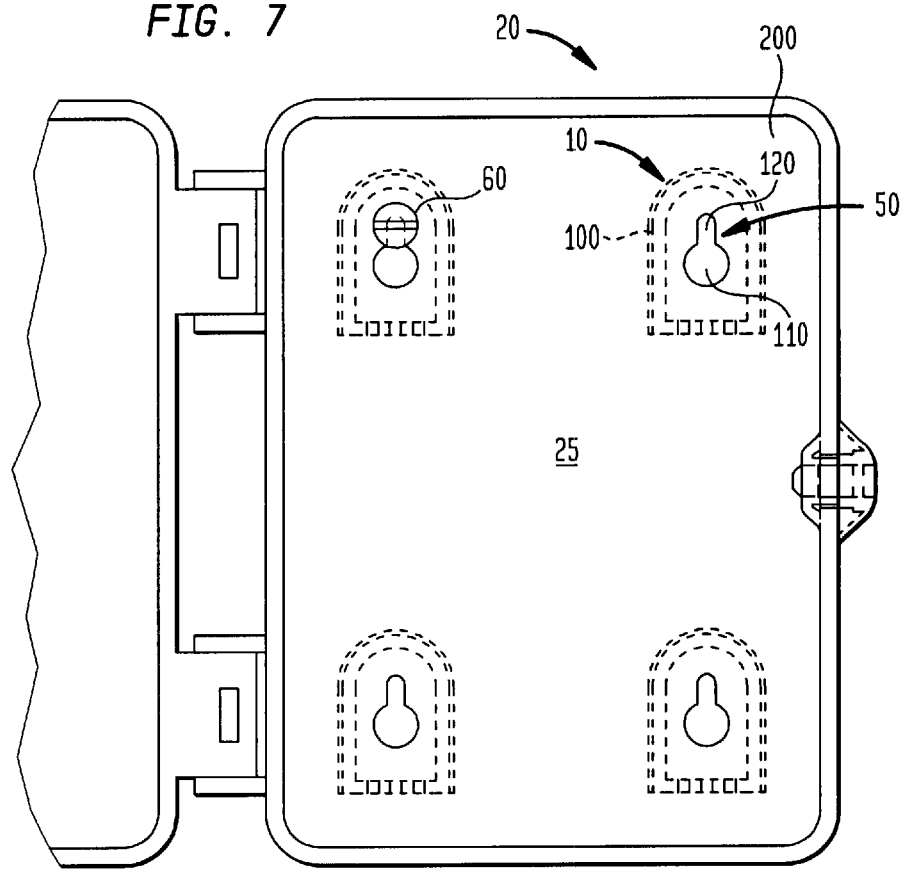
FIG. 7 is a front elevational view of a enclosure showing mounting brackets on the rear wall of the enclosure constructed in accordance with a preferred embodiment of the present invention.

As shown in FIGS. 1 and 7, through the rear wall 200 of outdoor enclosure 20, mounting bracket 10 may be affixed to enclosure 20 such that mounting aperture 50 is visible from the interior of enclosure 20 and forms a hole in rear wall 200. When viewed from the exterior of enclosure 20, as in FIG. 2, mounting bracket 10 is shown having a dome shape with mounting aperture 50 having a keyhole shape as further described below. Lip 100 is shown taking on the dome shape of mounting bracket 10. FIG. 3 shows a cross sectional side view of mounting bracket 10 having an exterior surface 30 and an interior surface 40. FIG. 3 further depicts mounting bracket 10 as affixed to enclosure 20 by integrally forming it as part of enclosure 20, although the bracket could just as well be separately formed and affixed to enclosure 20 by any suitable means known in the art. Exterior surface 30 of mounting bracket 10 is joined to rear wall 200 of enclosure 20. Similarly, lip 100 is shown as it protrudes above the top 130 of exterior surface 30. The interior surface 40 which in a preferred embodiment is formed as a portion of wall 200, has a keyhole shaped mounting aperture 50 of a type known in the art for permitting passage of a securement member 60 which may be, for example, a screw head, nail head, bolt, hook or the like. A widened portion of securement member 60 passes through a lower portion 110 of mounting aperture 50, and retention of the shank portion of member 60 is achieved in a second, narrower upper portion 120 of the mounting aperture 50. As discussed with reference to FIG. 1, mounting aperture 50 forms a hole through wall 200 as seen from the interior 25 of enclosure 20, such that the head of securement member 60 will reside within the interior 25 of enclosure 20. The lower portion 110 of mounting aperture 50 is in fluid communication with the interior 25 of enclosure 20. Of course one skilled in the art will recognize that the aperture 50 need not be shaped and sized as shown, but may be formed in any shape that permits the passage of a securement member 60 from the interior of the enclosure 25 to a mounting surface 210, while also providing a fluid communication path from the interior of the enclosure 25 to the outside environment via the bracket 10 as more fully described below. Moreover portions 110, 120 may be separate apertures.

Figure 4:
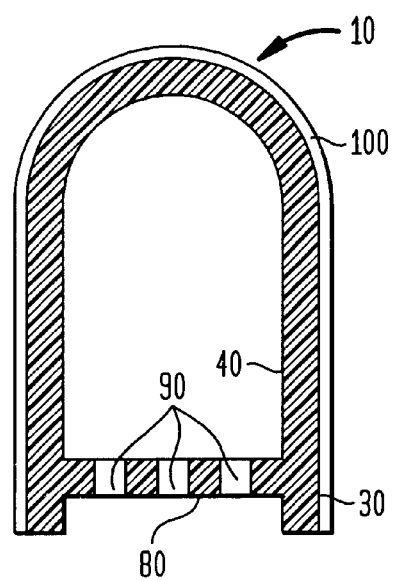
FIG. 4 is a cross sectional view taken through section A—A of FIG. 3 of the mounting bracket and the rear enclosure wall constructed in accordance with a preferred embodiment of the present invention.
Figure 5:
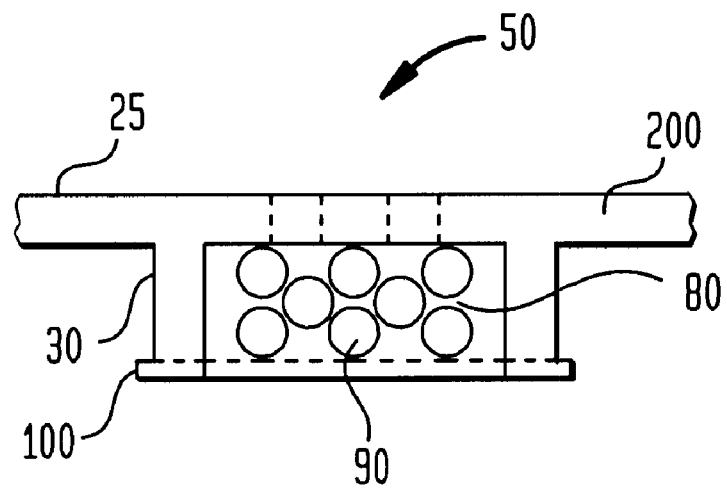
FIG. 5 is a bottom view of the mounting bracket depicting the vent holes constructed in accordance with a preferred embodiment of the present invention.
Figure 6:
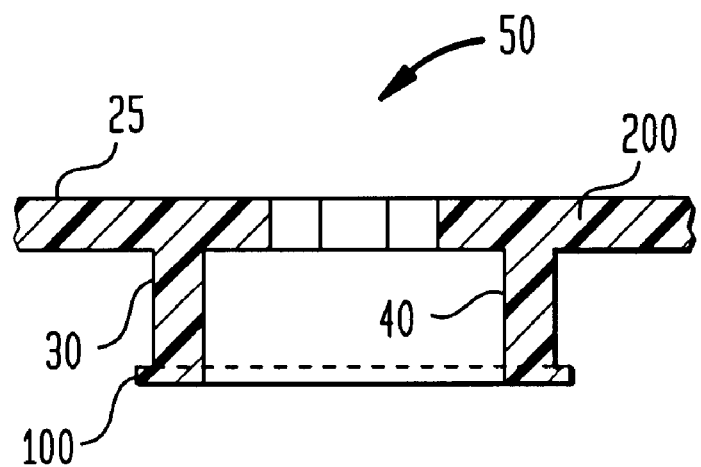
FIG. 6 is a bottom cross sectional view of the mounting bracket and rear enclosure wall taken through section B—B of FIG. 2 constructed in accordance with a preferred embodiment of the present invention.

Reference is made to FIG. 4, which depicts a cross sectional view along line A—A of FIG. 3, wherein the mounting bracket is further constructed with a bottom side 80 containing at least one vent hole 90 which is in fluid communication with the lower portion 110 of mounting aperture 50, shown in FIG. 3, for permitting the passage of air between the interior 25 and an ambient space outside the enclosure 20.

Reference is now made to FIGS. 3–6 and 8, depicting therein a preferred embodiment of the invention in which at least one mounting bracket 10 is located behind the enclosure 20 and the mounting bracket 10, both of which are constructed of a rigid moldable material such as a plastic or metal, for example. Additionally, the bracket 10 may be formed of a different material and may be affixed to the enclosure 20 by any known means. When bracket 10 is separately formed, aperture 50 may, of necessity, be formed through both a wall of the enclosure and the interior surface of the bracket, as required. Alternately, the bracket may be hollow, such that the wall of the enclosure to which the bracket will be mounted forms the interior surface of the bracket when the bracket and enclosure are mated.

The external surface 30 of the mounting bracket 10 may be dome shaped, having a curved top 130 and elongated sides 140 which preferably extends to a position lower than the bottom portion 80 of the external surface 30. The external surface 30 preferably has a portion which forms a lip or a shroud 100 around the external surface 30 of the mounting bracket 10. This lip 100 is so shaped to help channel water or other liquid down the sides 140 of the mounting bracket 10. Because the sides 140 extend beyond the bottom portion 80 of the mounting bracket 10, water or other liquid is further prevented from entering the enclosure 20. One of skill in the art would of course recognize that the exterior surface 30 and the lip 100 would not necessarily have to be dome shaped as depicted. These structures can be of any shape which is conducive to allowing the flow of water or other liquid from the top portion 130 of the mounting bracket 10, down the sides 140 and to the ground or other surface or structure below the enclosure.

Figure 8:
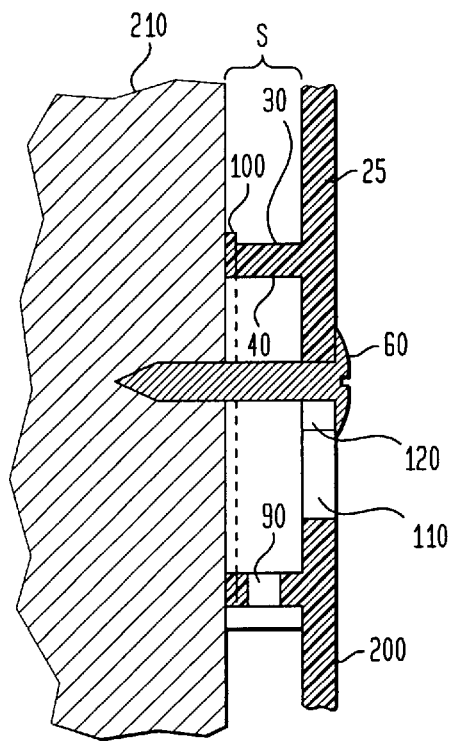
FIG. 8 is a cross sectional side view of the mounting bracket, the rear enclosure wall and a securement member in accordance with a preferred embodiment of the present invention.

In another preferred embodiment of the invention, and with specific reference to FIGS. 7 and 8, the outdoor enclosure 20 may have several mounting brackets 10. Further, these mounting brackets 10 may be so positioned on the outdoor enclosure 20 such that the securement members 60 are not accessible to anyone who is unauthorized to disturb the outdoor enclosure 20.

As shown in FIG. 8, mounting bracket 10, is affixed to mounting surface 210. Lip 100 of exterior surface 30 is flush against mounting surface 210. Securement member 60 helps to achieve this result when driven into mounting surface 210. When mounting the enclosure 20 to mounting surface 210, the head of securement member 60 initially passes through lower portion 110 of mounting aperture 50. The shank of securement member 60 is then positioned in upper portion 120 of mounting aperture 50. When enclosure 20 is mounted to mounting surface 210, a small space S (FIG. 8) is formed between rear wall 200 of enclosure 20 and mounting surface 210. This space allows water or other liquid to pass behind the enclosure 20 and fall through to the ground. Liquid will not collect behind the enclosure 20 or enter enclosure 20. Instead water or other liquid which impinges upon the top 130 of exterior surface 30, is channeled between lip 100 and rear wall 200, travels down sides 140, and falls to the ground. As discussed previously, because sides 140 protrude lower than bottom 80, liquid is impeded from entering vent holes 90 and therefore is prevented from entering enclosure 20. Additionally, the interior of the enclosure is vented by virtue of the fluid communication channel formed between the outside ambient environment and the enclosure interior through vent holes 90 and lower aperture portion 110. When the enclosure is closed, the bracket is not accessible from outside the enclosure.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A mechanism for mounting and venting an enclosure, comprising:

a mounting bracket adapted to be mountable to an enclosure having an interior portion, said bracket having an exterior surface and an interior surface, said interior surface having a mounting aperture adapted for receiving a securement member and for forming a venting aperture in fluid communication with said interior portion;

said bracket having a bottom surface containing at least one vent hole in fluid communication with said venting aperture for creating a fluid communication channel between said interior portion and an ambient space outside said enclosure; and a lip formed at an edge of said exterior surface for forming a channel for channeling liquid in a predetermined path along said exterior surface.

2. The mechanism of claim 1, wherein said exterior surface of said bracket is so shaped and sized as to inhibit the entry of liquid into said vent hole.

3. The mechanism of claim 1, wherein said exterior surface of said bracket is dome shaped.

4. The mechanism of claim 1, wherein said mounting aperture is keyhole shaped.

5. The mechanism of claim 1, wherein a portion said exterior surface extends below said bottom surface for inhibiting the entry of liquid into said vent hole.

6. The mechanism of claim 5, wherein said lip extends below said bottom surface.

7. A vented enclosure mountable to a mounting surface, comprising:

an enclosure having an interior portion, a mounting bracket mounted to said enclosure, said bracket having an exterior surface and an interior surface, said interior surface having a mounting aperture extending through said bracket and said enclosure for receiving a securement member and for forming a venting aperture in fluid communication with said interior portion; and said bracket having a bottom surface containing at least one vent hole in fluid communication with said venting aperture for creating a fluid communication channel between said interior portion of said enclosure and an ambient space outside said enclosure.

8. The enclosure of claim 7 further comprising a plurality of mounting brackets.

9. The enclosure of claim 7 wherein the mounting bracket is integrally formed on the enclosure.

10. The enclosure of claim 7 wherein said enclosure is a junction box.

11. The enclosure of claim 7 wherein said enclosure is a building entrance protectors box.

12. The enclosure of claim 7 wherein said enclosure is a network interface unit.

13. The enclosure of claim 7, wherein said exterior surface of said bracket is so shaped and sized as to inhibit the entry of liquid into said vent hole.

14. The enclosure of claim 7, wherein said exterior surface of said bracket is dome shaped.

15. The enclosure of claim 7, further comprising a lip formed at an edge of said exterior surface for contacting a mounting surface upon which said enclosure is mountable and for forming a channel for channeling liquid in a predetermined path along said exterior surface in a space between said mounting surface and said enclosure.

16. The enclosure of claim 7, wherein said mounting aperture is keyhole shaped and has an upper portion for receiving said securement member and a lower portion forming said venting aperture.

17. The enclosure of claim 7, wherein said venting aperture and said mounting aperture are separate apertures.

18. The enclosure of claim 15, wherein said exterior surface extends below said bottom surface for inhibiting the entry of liquid into said vent hole.

19. The enclosure of claim 18, wherein said lip extends below said bottom surface.

20. A method of forming a vented enclosure, comprising:

mounting a mounting bracket to an enclosure having an interior portion, wherein said mounting bracket has an exterior surface and an interior surface, forming on said interior surface a mounting aperture for receiving a securement member and for forming a venting aperture in fluid communication with said interior portion; and forming on said bracket a bottom surface containing at least one vent hole in fluid communication with said venting aperture for creating a fluid communication channel between said interior portion and an ambient space outside said enclosure.

* * * * *